Aug. 7, 1945.　　　R. D. KELLER　　　2,381,126
OPHTHALMIC INSTRUMENT
Filed Nov. 6, 1943
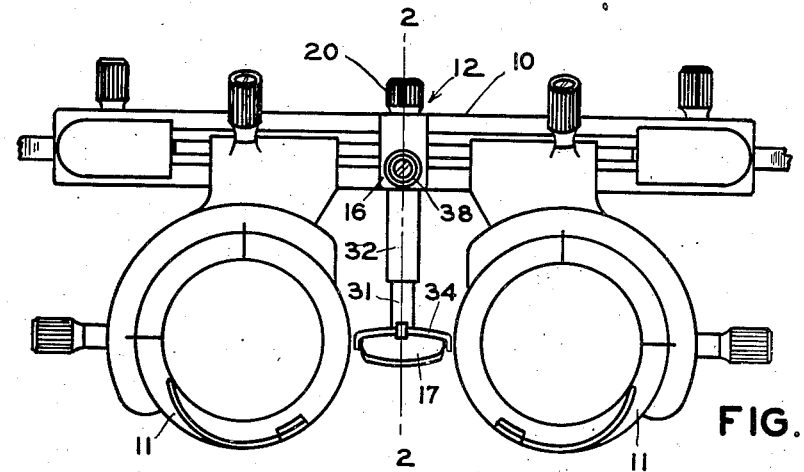
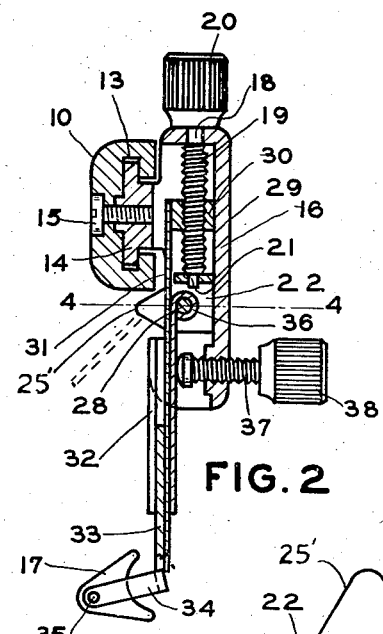
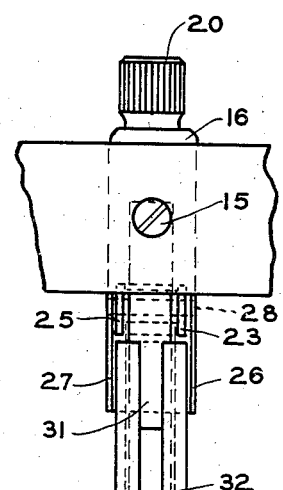
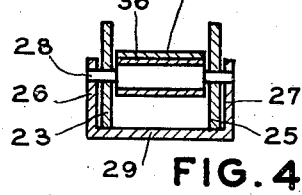
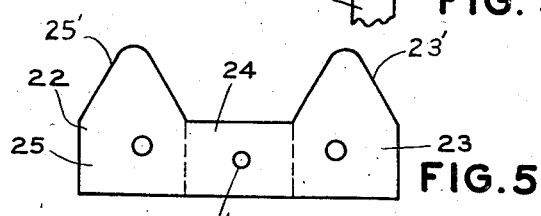
ROBERT D. KELLER
INVENTOR
BY
ATTORNEYS Patented Aug. 7, 1945

2,381,126

UNITED STATES PATENT OFFICE 2,381,126

OPHTHALMIC INSTRUMENT

Robert D. Keller, Rochester, N. Y., assignor to Bausch & Lomb Optical Company, Rochester, N. Y., a corporation of New York Application November 6, 1943, Serial No. 509,247

11 Claims. (Cl. 88—20)

This invention relates to ophthalmic instruments and more particularly to improvements in trial frames.

In the examination of the eyes of a patient, trial frames are often employed by opticians and oculists to hold test lenses before the eyes. For this purpose, the frame is supported on the bridge of the nose of the patient with the optical center of the lenses in alignment with the pupils of the patient's eyes. Due to variations in the facial characteristics of each patient, it is necessary to adjust the frame relative to the bridge of the nose to assure the proper placement of the lenses before the eyes and, for this purpose, an adjustable nose rest is provided on the frame.

This invention contemplates the provision of a frame having vertically and laterally adjustable supporting means and it is another object of the present invention to provide simple, compact and efficient means whereby the supporting means may be held in any desired adjusted position.

Other objects and advantages reside in certain novel features of construction, arrangement and combination of parts as will hereinafter be more fully described and pointed out in the appended claims.

In the drawing:

Fig. 1 is a front elevation of a trial frame embodying the present invention.

Fig. 2 is an enlarged detail sectional view taken on line 2—2 of Fig. 1.

Fig. 3 is an enlarged rear view of the same.

Fig. 4 is an enlarged detail sectional view taken on line 4—4 of Fig. 2.

Fig. 5 is an enlarged plan view of a casing blank embodied in the invention.

In the drawing, the numeral 10 designates the body of the trial frame from which depend the lens holders 11. The lens holders 11 are axially movable and angularly adjustable of the body 10 in any manner known to the art for adjusting the test lenses correctly with respect to the interpupillary distance between the eyes of the patient and also to conform to the contours of the face of the patient, respectively.

In the preferred embodiment of the invention, the nose piece comprises a mounting assembly 12 fixedly secured to the central portion of the body 10. For this purpose, the body 10 is formed with an internal horizontal channel 13 for receiving a bracket 14 integral with the mounting assembly 12. The bracket 14 may be slid into and along the channel from either end of the body 10 and is fixedly held therein by means of a screw 15 threaded into tapped openings in the body 10 and bracket 14. By so doing, the mounting assembly 12 will be immovably held on the body 10.

Depending from the bracket 14 and integral therewith is a housing 16 containing the mechanism for effecting lateral and vertical adjustment of the nose rest 17 relative to the body 10 of the trial frame. The top of the housing 16 has an opening therein for receiving and supporting a bearing member 18 carried by one end of a threaded shaft 19. This end of the shaft projects beyond the housing and carries a knurled knob 20 for rotating the shaft. The other end of the shaft has a bearing member 21 received and supported in an opening 21' in a casing 22 mounted within the housing 16. The shaft 19 is held against longitudinal movement in the housing by forming its bearing member 18 of a diameter less than the diameter of the threaded portion of the shaft and the knob 20.

Referring to Fig. 5, the casing 22 comprises a blank of material having three openings therein and, when bent up along the dotted lines, forms three walls 23, 24 and 25 with an opening in each wall. The casing is mounted within the housing 16 through the engagement of the side walls 23 and 25 of the casing with the side walls 26 and 27 of the housing and is held therein by the reduced end portions of a pin 28 inserted into openings in the side walls of the housing and casing. By so doing, the portions of the walls of the casing, contacting the front wall 29 of the housing 16, will restrain the movement of the casing within the housing. As the casing is thus held fixed within the housing, it will be apparent that the shaft 19 is held against longitudinal movement in the housing but will be freely rotatable therein by turning the knob 20.

For the purpose of effecting vertical adjustment of the nose rest 17 relative to the body 10 of the trial frame, a traveling nut 30 is threaded on the shaft 19 and held against rotation by the front wall of the housing, which will also serve as a guide member upon movement of the nut axially of the shaft 19. A resilient member or spring 31 having one end thereof fixed to the nut 30 extends downwardly through the housing and through a sleeve 32 having a tubular bearing member 36 sleeving the pin 28. Secured to the spring 31 is a slide bar 33 to which is secured a forked bracket 34. The nose rest 17 is pivotally mounted between the tines of the bracket by pins 35 to thereby permit the nose rest to angularly adjust itself to the bridge of the nose upon engagement therewith.

The sleeve 32 is accurately formed to permit free sliding movement of the bar 33 and spring 31 within the sleeve and also to guide the movement of those members during the vertical and lateral adjustment of the nose rest 17 relative to the body 10.

To cause the vertical displacement of the nose rest 17 relative to the body 10, the knob 20 is rotated. The threaded shaft 19 will then rotate to move the traveling nut 30 axially of the shaft. As the spring 31 and nut 30 are connected, the spring 31 will be moved vertically in the sleeve 32. This movement of the spring will cause the bar 33 with its bracket 34 to move the nose rest 17 vertically relative to the body 10.

Lateral displacement of the nose rest 17 is effected by means of an adjustable member which may comprise a screw 37 threadedly mounted in the front wall 29 of the housing and having at its inner end an enlarged head forming an actuating member for causing the sleeve 32 to be pivotally moved about the pin 28. Upon rotation in one direction of the knurled knob 38, attached to the screw 37, the screw will press the enlarged head against the sleeve 32 to pivotally move the same about the pin 28. Due to the inherent resiliency of the spring 31, the spring will bend to permit the sleeve to be moved about the pin 28 and will exert sufficient pressure on the sleeve 32 to maintain it in engagement with the head of the screw 37. Upon movement of the knob 38 in the other direction, the action of the spring 31 will hold the sleeve 32 against the head of the screw 37 until the spring and sleeve are returned to their normal positions. The nose rest 17 can thus be moved laterally of the body 10 to some desired adjusted position wherein the trial frame will be supported on the bridge of the patient's nose with the optical centers of the lenses held in alignment with the pupils of the eyes of the patient.

To prevent distortion of the spring by flexing the same beyond the limit of its elasticity, the walls 23 and 25 of the casing extend outwardly from the housing 19 to form stop members 23' and 25' for limiting the pivotal movement of the sleeve 32. As shown in dotted lines in Fig. 2, the outward pivotal movement of the sleeve is prevented after the upper end face of the sleeve 32 is moved into engagement with the stop members.

From the foregoing, it will be apparent that I have provided an improved trial frame having compact and efficient means for quickly and accurately positioning and holding the nose rest with respect to the bridge of the nose of a patient which will compensate for variations in the facial characteristics of the patient to permit the optical centers of the lenses of the trial frame to be easily aligned with the pupils of the patient's eyes.

Various modifications can obviously be made without departing from the spirit of my invention, as pointed out in the appended claims.

I claim:

1. In an ophthalmic lens frame, the combination of a body; a nose piece assembly carried by said body intermediate the ends thereof, said nose piece assembly comprising resilient means; the upper part of said means being movably secured to the assembly; a nose rest carried by the lower portion of said resilient means; means on the assembly engaging said resilient means for moving said resilient means and nose rest vertically of said body; and means carried by the body and engaging said resilient means for flexing the same to move said nose rest laterally of said body into adjusted position.

2. In an ophthalmic lens frame, the combination of a body; a nose piece assembly carried by said body intermediate the ends thereof, said assembly comprising a housing; resilient means depending from and supported by said housing; a nose rest carried by the lower portion of said resilient means; means carried by the housing for moving said resilient means vertically of said body; and means carried by the housing and engaging said resilient means for flexing the same to move said nose rest laterally of said body into adjusted position.

3. In an ophthalmic lens frame, the combination of a body; a nose piece assembly carried by said body intermediate the ends thereof, said nose piece assembly comprising a housing; resilient means carried by said housing; a nose rest carried by said resilient means; means for moving said resilient means vertically of said housing to vertically adjust said nose rest relative to said body; means carried by the housing and engaging said resilient means for flexing said resilient means to move said nose rest laterally of said body; and means carried by the housing for limiting the lateral movement of said resilient means and said nose rest.

4. In an ophthalmic lens frame, the combination of a body; a nose piece assembly carried by said body intermediate the ends thereof, said nose piece assembly comprising a housing; resilient means depending from said housing; a nose rest carried by said resilient means; a guide member for said resilient means, said guide member being pivotally mounted within and projecting from said housing; means carried by the housing for moving said resilient means and said nose rest vertically of said body; and means engaging said guide member to move said member about its pivot, the movement of said guide member flexing said resilient means and moving said nose rest laterally of said body against the action of said resilient means.

5. In an ophthalmic lens frame, the combination of a body; a nose piece assembly carried by said body intermediate the ends thereof and normal thereto, said nose piece assembly comprising a housing; resilient means depending from and movably mounted on said housing; a nose rest carried by said resilient means; a guide member for said resilient means, said guide member pivotally mounted within said housing; means carried by the housing for moving said resilient means and nose rest vertically of said body; means carried by the housing and engaging said guide member to move said member about its pivot, the movement of said guide member flexing said resilient means and moving said nose rest laterally of said body against the action of said resilient means; and means carried by the housing for limiting the pivotal movement of said guide member.

6. In an ophthalmic lens frame, the combination of a body; a nose piece assembly carried by said body intermediate the ends thereof and normal thereto, said nose piece assembly comprising a housing; an elongate member rotatably mounted within said housing; traveler means carried by said elongate member and movable axially thereof upon rotation of said member; resilient means carried by said traveler means; a nose rest carried by said resilient means and movable therewith; a guide member pivotally mounted within said housing and engaging said resilient means; means carried by the housing for rotating said elongate member for moving said traveler means axially of said elongate member, the movement of said traveler means moving said resilient means and said nose rest vertically of said frame; and means carried by the housing and engaging said guide member for moving said guide member about its pivot, the movement of said member flexing said resilient means to move the nose rest laterally of said body.

7. In an ophthalmic lens frame, the combination of a body; a nose piece assembly carried by said body intermediate the ends thereof and normal thereto, said nose piece assembly comprising a housing; a vertically disposed elongate member rotatably mounted within said housing; traveler means carried by said member and movable axially thereof upon rotation of said member; resilient means depending from said traveler means; a nose rest pivotally mounted to the lower end of said resilient means and movable therewith; a guide member pivotally mounted within said housing and engaging said resilient means for guiding movement thereof; means for actuating said elongate member to move said traveler means axially of said elongate member, the movement of said traveler means moving said resilient means and said nose rest vertically of said body; and screw means carried by said housing and engaging said guide member for moving said guide member about its pivot, the movement of said guide member flexing said resilient means to laterally displace the nose rest relative to the body of the frame.

8. In an ophthalmic lens frame, the combination of a body; a nose piece assembly carried by said body intermediate the ends thereof and normal thereto, said nose piece assembly comprising a housing; an elongate member rotatably mounted in said housing normal to said body; traveler means carried by said elongate member and movable axially thereof upon rotation of said member; a resilient member secured to said traveler means and movable therewith; a nose rest pivotally mounted on said resilient member; a sleeve pivotally mounted within said housing and adapted to receive said resilient member for guiding movement thereof; means for actuating said elongate member to move said traveler means axially of said elongate member, the movement of said traveler means causing a vertical displacement of said resilient member and said nose rest; an adjustable member carried by said housing and movable in a path normal to the axis of said elongate member for engaging said sleeve to move the sleeve about its pivot, the movement of said sleeve flexing said resilient means to move said nose rest laterally of said body; and stop means for limiting the lateral displacement of said nose rest.

9. In an ophthalmic lens frame, the combination of a body; a nose piece assembly carried by said body intermediate the ends thereof and normal thereto, said nose piece assembly comprising a housing; a threaded shaft rotatably mounted in said housing normal to said body; a nut carried by said elongate member and movable axially thereof upon rotation of said member; a leaf spring having one end secured to said nut; a slide bar secured to the opposite end of said spring and movable therewith; a bracket carried by said bar; a nose rest pivotally mounted on said bracket; a sleeve pivotally mounted in said housing and engaging said spring and said slide bar for guiding movement thereof; means for rotating said shaft to move said nut axially of said member, the movement of said nut causing a vertical displacement of said nose rest; a screw member carried in said housing and adapted to engage and move said sleeve about its pivot, the movement of said sleeve flexing said spring to cause a lateral displacement of said nose rest relative to said body; and a stop member carried by said housing to limit the pivotal movement of said sleeve.

10. In a trial frame the combination of a body carrying lens holding devices; supporting means carried by the body between the devices; guide means mounted on pivot means carried by the supporting means; resilient means movably carried by the supporting means, said resilient means being slidably mounted on and extending below said guide means; nose engaging means carried by the lower portion of the resilient means; means carried by the supporting means for adjustably moving said resilient means whereby the nose engaging means may be adjusted vertically; and means carried by the supporting means for moving said guide means about the pivot means and flexing said resilient means whereby the nose engaging means may be adjustably positioned laterally with respect to the body.

11. In a trial frame the combination of a body supporting spaced lens holders; a member carried by the body between the holders; a guiding device projecting below and pivotally carried by the member; a resilient element slidably carried by the device; a nose engaging member carried by the lower portion of the element; a screw rotatably supported by the member; means operatively connecting the screw to the element whereby rotation of the screw will effect a sliding vertical adjustment of the element relative to the device and thereby enable adjustment of the nose engaging member; a second screw carried by the lower portion of the member; a part of said second screw being in engagement with the guiding device whereby the device may be moved against the tension of the resilient element to adjustably position the nose engaging member laterally of the body.

ROBERT D. KELLER.